United States Patent
Weinmann

[19]

[11] Patent Number: 6,035,729
[45] Date of Patent: Mar. 14, 2000

[54] WHEEL OFFSET MEASURE

[76] Inventor: Thomas Weinmann, 8922 Bosun Cir., Huntington Beach, Calif. 92646

[21] Appl. No.: 08/904,034

[22] Filed: Jul. 31, 1997

[51] Int. Cl.[7] .................................................... G01B 3/20
[52] U.S. Cl. ................................ 73/865.8; 33/203; 73/146
[58] Field of Search .............................. 33/335, 336, 337, 33/203, 600, 809; 73/146, 865.8, 290 R

[56] References Cited

U.S. PATENT DOCUMENTS

| | | | |
|---|---|---|---|
| 2,381,276 | 8/1945 | Greenleaf et al. | 33/203 |
| 4,129,950 | 12/1978 | Weinhaus et al. | 33/178 R |
| 4,271,599 | 6/1981 | Pavitt | 33/336 |
| 4,377,038 | 3/1983 | Ragan | 33/336 |
| 4,953,307 | 9/1990 | Loucas | 33/203 |
| 5,101,569 | 4/1992 | Watkins | 33/203 |
| 5,412,878 | 5/1995 | Edman | 33/203 |
| 5,452,606 | 9/1995 | Castelnuovo | 33/203 |
| 5,653,040 | 8/1997 | Little et al. | 33/203 |

*Primary Examiner*—Eric S. McCall
*Attorney, Agent, or Firm*—Dennis W. Beech

[57] ABSTRACT

The wheel offset measure has three straight edge rulers that are interconnected for use in measuring the offset and backspace of a vehicle wheel. A mounting rule is used to hold a rim width rule and a backspace rule and to bridge the diameter of a wheel rear flange. When in place on the rear flange the rim width rule is set to the dimension of the rim width. The backspace rule is then adjusted to touch the mounting pad of the wheel. The relative position of the centerline end of the rim width rule and the zero end of the backspace rule are used to read the offset in millimeters. The backspace dimension can be read from the backspace rule relative to the mounting rule.

2 Claims, 4 Drawing Sheets

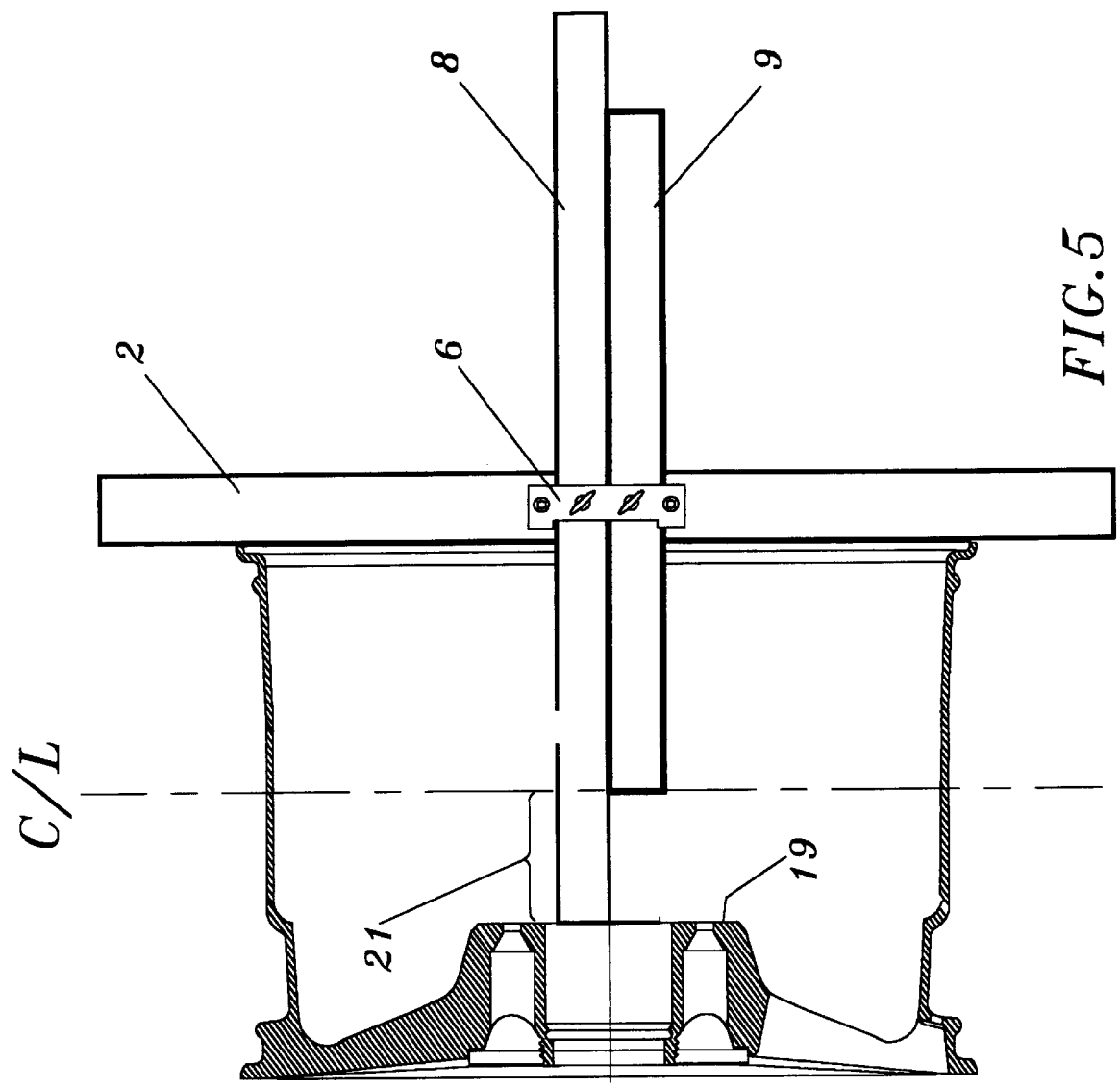

WHEEL OFFSET MEASURE

BACKGROUND OF THE INVENTION

1. Field of the Invention

This invention relates to measuring instruments used to determine the dimensions of vehicle wheels. The new device provides a simple means to measure vehicle wheel offset between the wheel centerline and the mounting pod.

2. Description of Related Art

There are currently in use measuring rulers and equations for the determination of a vehicle wheel centerline, backspace and offset. These methods require the taking of one or more measurements related to wheel width and mounting pad location. A calculation must then be performed to determine the wheel offset.

These steps are necessary to convert between the two commonly used measures of wheel mounting location and the back edge of the wheel rim. In common practice wheel backspace is usually measured in inches and offset is measured in millimeters. Depending on the manufacturer, one or the other of these measures is specified and it is often necessary to convert between the two measures in use of the wheels with a particular vehicle.

The present invention provides in one measuring device the means to measure a wheel backspace and offset without the need to perform the offset calculation. By direct measure and reading of these values wheels can be quickly checked for accuracy and calculation error is reduced. The tool is particularly useful in the situation where many wheels of varying dimensions must be checked.

SUMMARY OF THE INVENTION

One object of the present invention is to allow backspace of a wheel to be measured and to determine offset measure based on rim width. Another object is to allow direct indication of offset based on setting the device at a known rim width and adjustment of a measuring rule to the measured backspace.

In accordance with the description presented herein, other objectives of this invention will become apparent when the description and drawings are reviewed.

BRIEF DESCRIPTION OF THE DRAWING

FIG. 5 illustrates the wheel offset measure applied to a vehicle wheel with positive offset.

DESCRIPTION OF THE PREFERRED EMBODIMENT

The wheel offset measure device has three straight edge rule elements. One is a mounting rule which is used to bridge across the rear flange of a wheel and also holds the other two rules. The rim width rule and backspace rule are slidably mounted on the mounting rule adjacent to each other. There are locking fasteners to hold the rim width rule and backspace rule in a fixed measurement position. There are marking lines and set points to measure rim width, backspace and offset on the rulers.

Figure 1:
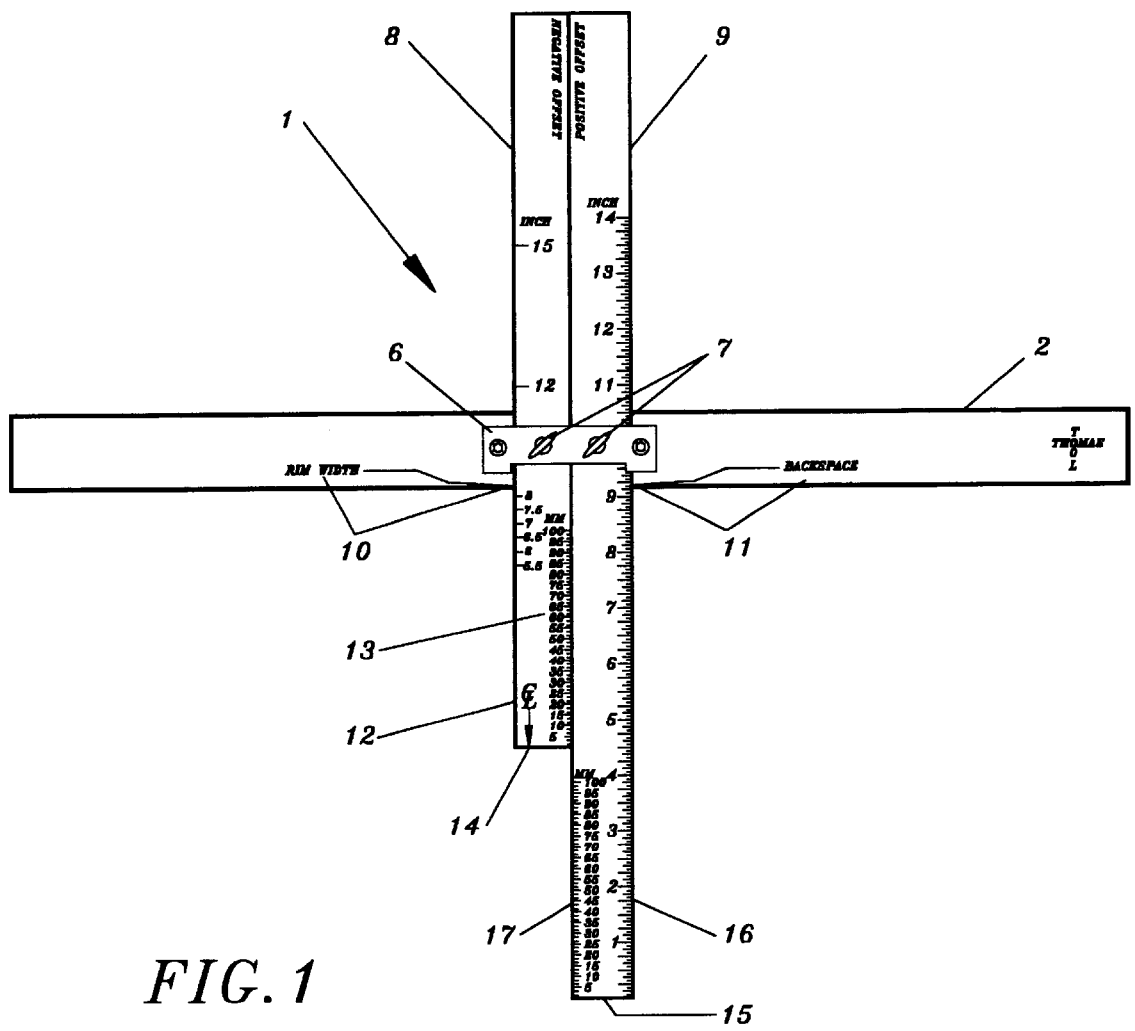
FIG. 1 illustrates a plan view of the wheel offset measure showing marked line measures and setting points.
Figure 2:
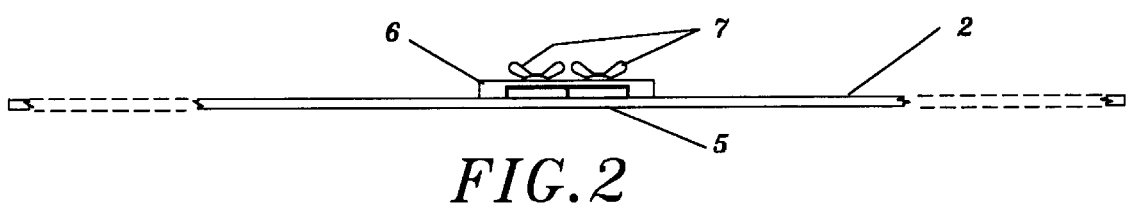
FIG. 2 illustrates an end view of the invention.
Figure 3:
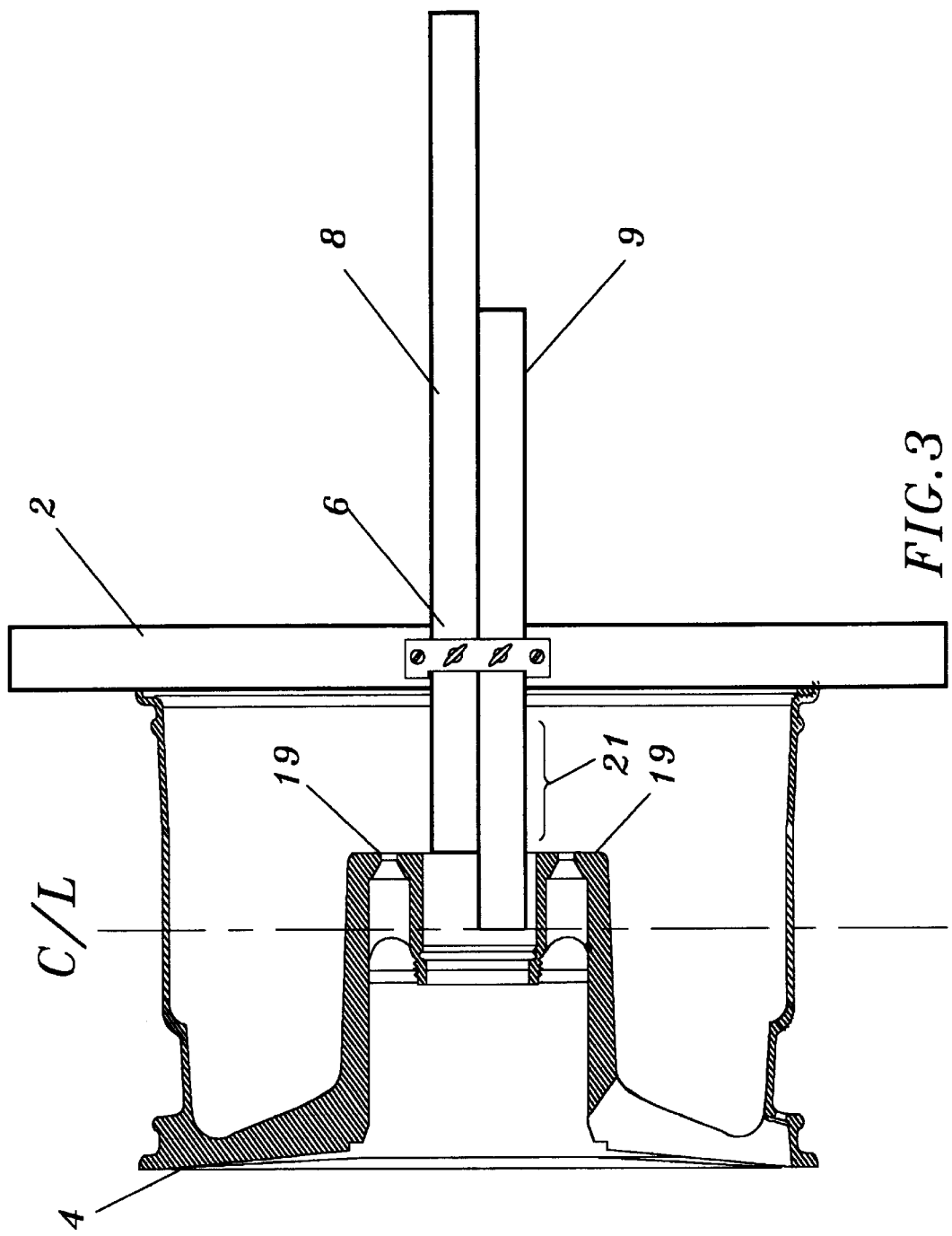
FIG. 3 illustrates the wheel offset measure applied to a vehicle wheel with negative offset.

Referring to FIGS. 1 through 3, the wheel offset measure (1) has a mounting rule (2) of sufficient length to bridge across the rear flange (3) of a vehicle wheel (4). At the approximate rule center (5) of the mounting rule (2) a slide bracket (6) is attached which slide bracket (6) has two locking fasteners (7) or screws. A marked line for rim width line (10) and backspace line (11) is placed on the mounting rule (2).

A rim width rule (8) and backspace rule (9) are slidably mounted in the slide bracket (6) adjacent to each other as illustrated in FIG. 1. A locking fastener (7) is located such that the rim width (8) and backspace rule (9) may be retained in a fixed position.

The rim width rule (8) has marked lines in inches ruled on the rim outside edge (12) and marked lines in millimeters ruled on the rim inside edge (13). The inch marks are actually one half the standard inch measure to allow for the wheel (4) centerline being one half the rim width (18). The zero point for these marked lines is the centerline end (14) of the rim width rule (8). Negative offset is marked on the rim width rule (8) rim inside edge (13) so that when the rim width rule (8) extends beyond the zero end (15) of the backspace rule (9), offset is read as a negative number on the rim width rule (8) at the measurement aligned with the zero end (15).

The backspace rule (9) has marked lines in inches ruled on the backspace outside edge (16) and marked lines in millimeters ruled on the backspace inside edge (17). The zero point for these marked lines is the zero end (15) of the backspace rule (9). Positive offset is marked on the backspace rule (9) backspace inside edge (17) so that when backspace inside edge (17) extends beyond the centerline end (14) of the rim width rule (8), offset is read as a positive number on the backspace rule (9) at the measurement aligned with the centerline end (14).

To measure the parameters of a vehicle wheel (4) the rim width (18) is determined. This dimension is most often marked on the wheel (4). If it is not, the measurement can be made directly using a ruler lined in inches or using the backspace rule (9). The rim width rule (8) is then set to the rim width (18) dimension at the rim width line (10) and fixed in place with a locking fastener (7).

The wheel offset measure (1) is then placed on the wheel (4) by resting the mounting rule (2) on the rear flange (3) of the wheel (4) such that the rim width rule (8) centerline end (14) extends into the wheel (4) and if necessary through the centerbore of the wheel. The backspace rule (9) is then adjusted until the zero end (15) rests on the mounting pad (19). The backspace rule (9) is fixed at this position by a locking fastener (7).

At this point in the use of the wheel offset measure (1) the backspace (20) and offset (21) may be read simultaneously. The backspace (20) is read directly at the backspace line (11) in inches. The offset (21) is read from either the rim width rule (8) or backspace rule (9) depending on whether the wheel (4) has positive or negative offset. The simultaneous measure of backspace and offset is not known to be a function of other measuring devices which must measure each separately.

If the rim width rule (8) extends beyond the zero end (15), the offset (21) is read on the rim width rule inside edge (13) marking lines as a negative offset in millimeters at the point of alignment with the zero end (15). Such a configuration is illustrated in FIG. 3.

If the backspace rule (9) extends beyond the centerline end (14) the offset (21) is read on the backspace rule (9)

inside edge (17) marking lines as a positive offset in millimeters at the point of alignment with the centerline end (14). Such a configuration is illustrated in FIG. 5.

Figure 4:
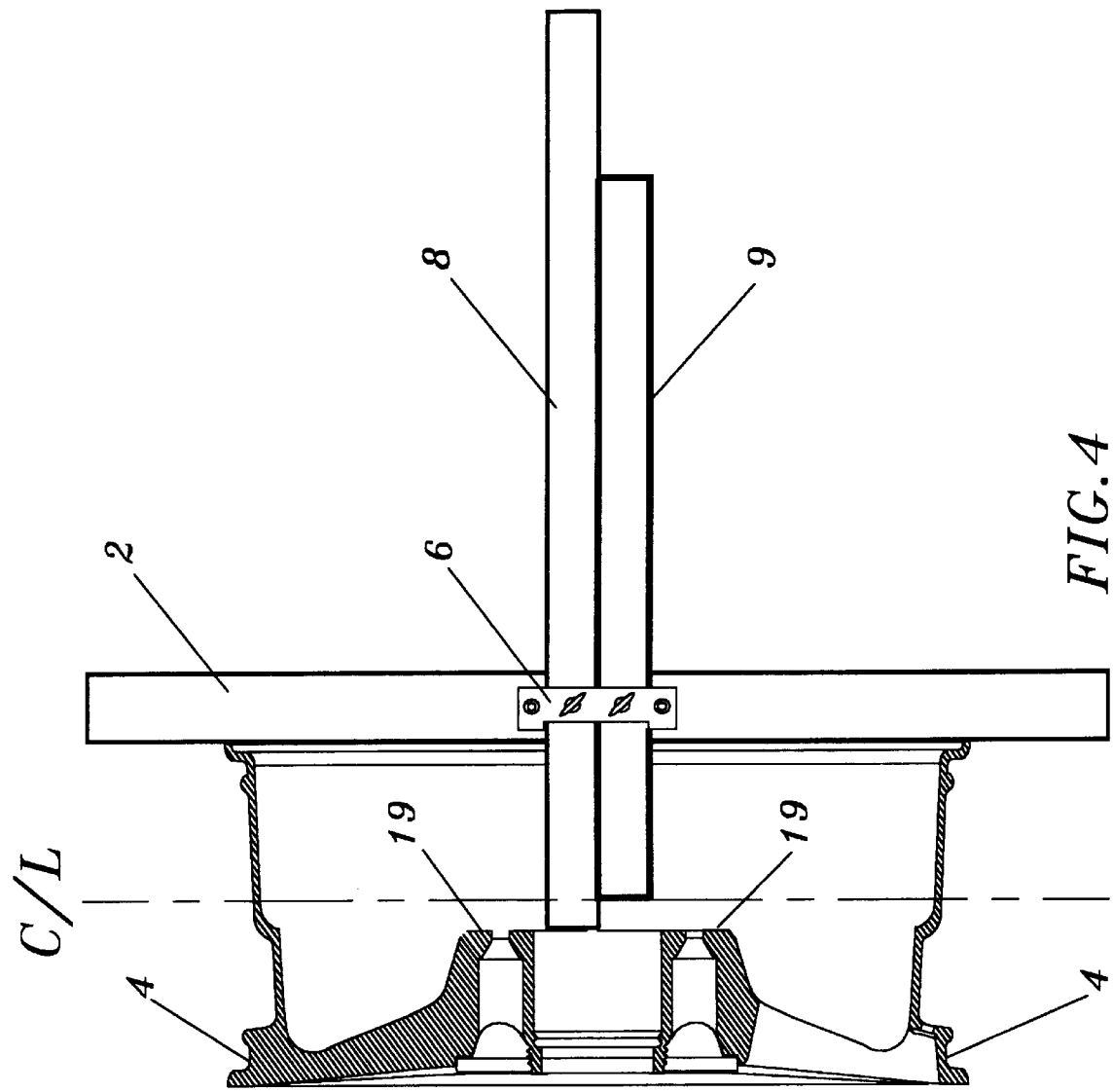
FIG. 4 illustrates the wheel offset measure applied to a vehicle wheel with zero offset.

If the rim width rule (8) and backspace rule (9) align with each other, the offset (21) is zero as illustrated in FIG. 4.

In this description of use of the wheel offset measure (1), the width of the rear flange (3) must be taken into account. This may be done by providing an offset of the zero point of the backspace outside edge (16) marked lines or may be done with an appropriate adjustment to the reading from the wheel offset measure (1).

The wheel (4) flanges are not part of the rim width (18) dimension, but the rear flange (3) is part of the backspace (20) dimension. To obtain the offset (21) dimension, the width of the rear flange (3) must be subtracted from the backspace (20) measurement. The formula representing this measurement taken is [(Backspace−½")−(½ Rim Width)]× 25.4 mm/inch=Offset in millimeters.

I claim:

1. A device for measuring backspace and offset of a vehicle wheel comprising:

a mounting rule having a slide bracket attached at approximately a rule center and the slide bracket having two locking fasteners mounted therein;

a rim width rule slidably mounted in the slide bracket adjacent to a backspace rule slidable mounted in the slide bracket;

the rim width rule having on a rim outside edge marked lines in inches and on a rim inside edge marked lines in millimeters wherein a centerline end is a zero point for the marked lines;

the backspace rule having on a backspace outside edge marked lines in inches which are proportionally one half a standard inch measure and on a backspace inside edge marked lines in millimeters wherein a zero end is a zero point for the marked lines; and the mounting rule having a rim width line marked adjacent to the rim outside edge and a backspace line marked adjacent to the backspace outside edge.

2. A method for measuring backspace and offset of a vehicle wheel using a wheel offset measure comprising the steps of:

a. determining a rim width of a wheel;

b. adjusting a rim width rule on a mounting rule to the rim width and fixing the rim width rule at that adjustment;

c. placing the mounting rule on a rear flange of the wheel;

d. adjusting a backspace rule until a zero end touches a mounting pad of the wheel and fixing the backspace rule at that adjustment; and e. reading the backspace and offset from the wheel offset measure.

* * * * *